March 9, 1948. R. A. FLYNN 2,437,250
MEANS FOR SELECTIVE DISCONNECTION OF AILERON CONTROLS
Filed June 5, 1944
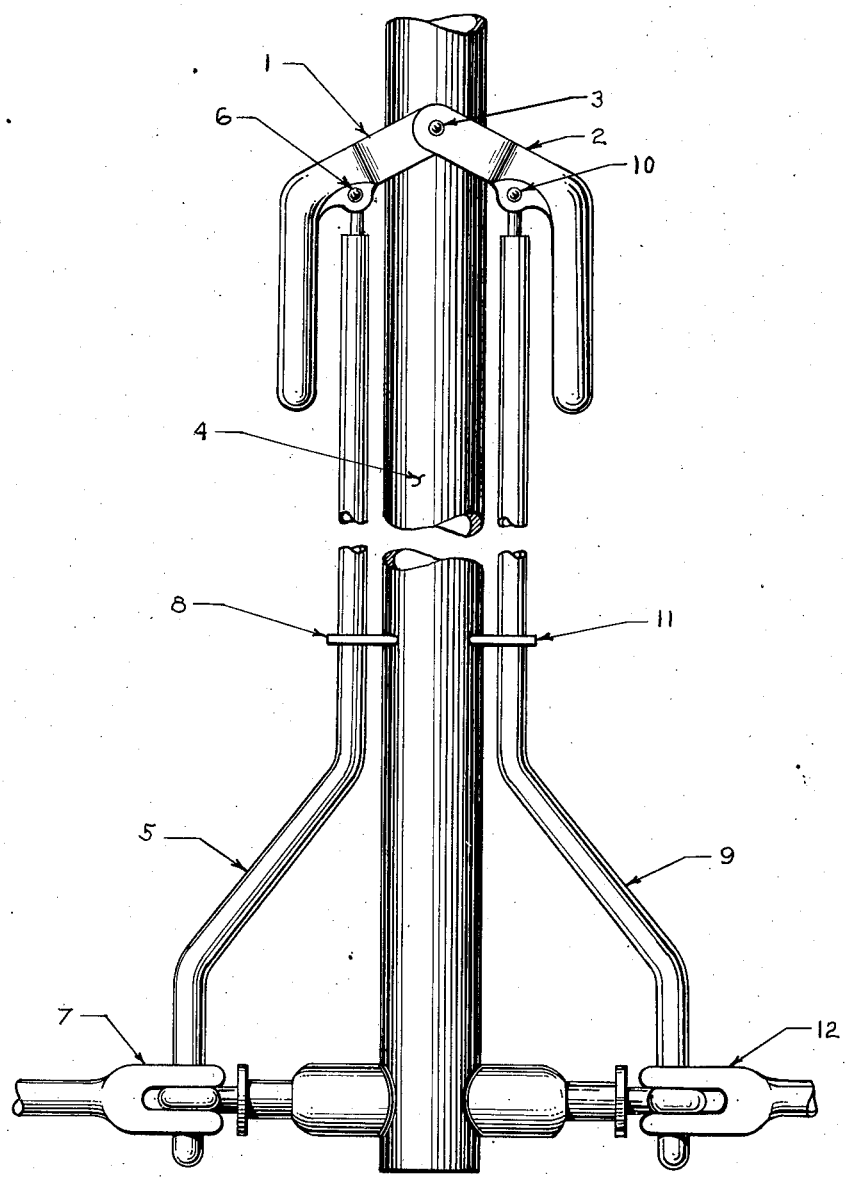
Inventor
ROBERT AMBROSE FLYNN
By
Attorney Patented Mar. 9, 1948

2,437,250

UNITED STATES PATENT OFFICE 2,437,250

MEANS FOR SELECTIVE DISCONNECTION OF AILERON CONTROLS

Robert Ambrose Flynn, United States Navy

Application June 5, 1944, Serial No. 538,797

4 Claims. (Cl. 244—83)

(Granted under the act of March 3, 1883, as amended April 30, 1928; 370 O. G. 757)

The subject of this invention is a safety device for airplanes, to avoid entire loss of lateral control when damage is sustained to a wing while in flight and the aileron control of that wing or the aileron itself is jammed.

The object of this device is to save the airplane by regaining at least some lateral control, in case damage to one wing jams the aileron on that wing or its control thus otherwise eliminating all possibility of lateral control.

Another object is to make this device by a very simple attachment on the control stick which will not be in the way but will be within easy reach of the pilot and will be easy to manipulate when so desired.

Other and more specific objects of the invention will become apparent in the following detailed description thereof, having reference to the accompanying drawing, wherein the single figure clearly shows the arrangement of parts on the control stick, only a portion of which is shown.

The preferred form of the invention as shown in the drawing comprises a pair of lever arms 1 and 2 having a common pivot 3 on the control stick 4 and formed angularly as shown so that normally they would not present any undue projecting obstructions. A rod 5 formed as shown is pivoted at its upper end to the lever 1 at 6 and its lower end serves as a pin for the clevis 7, one portion of which is integral with the control stick, the other being connected to the left aileron control. The loop 8 attached to the control stick serves to guide the rod 5.

A similar linkage comprising the rod 9 pivoted at 10 to the arm 2, guide 11 and clevis 12 is arranged for the right aileron control.

When it is desired to release either control which might be jammed, the corresponding arm 1 or 2 is pulled up, pulling the rod out of the clevis, thus releasing the control stick for free operation of the other aileron.

As a result an airplane which might otherwise result in a total loss besides endangering the lives of its occupants, might be saved by regaining sufficient lateral stability to effect an emergency landing with little or no damage to the remainder of the aircraft or the personnel.

Various modifications in form, size and arrangement of this device may be made without departing from the spirit and scope thereof as defined in the appended claims.

The invention described herein may be manufactured and used by or for the Government of the United States of America for governmental purposes without the payment of any royalties thereon or therefor.

What is claimed is:

1. In an airplane control system, a control stick having one set of conventional control connections, said control connections including aileron control connections having a pair of clevis pin joints therein at opposite sides of said control stick respectively, means on said control stick, having a link connected to the pin of each clevis pin joint, for selectively pulling out the clevis pin from either one of said pair of clevis pin joints in case of jamming of the corresponding control connection, to release the stick for actuation of the remaining control connections.

2. In an airplane control system, a control stick, a pair of control surface connections extending from the stick to opposite sides of said airplane, to control movement of said airplane about its longitudinal axis, clevis pin joints in said control surface connections, clevis pins in said joints and means on said control stick having a link connected to each clevis pin for selectively pulling out the pin from one of said joints in case of jamming of the corresponding control connection to release the stick for actuation of the other control connection.

3. In an airplane control system, a control stick, a set of control surface connections extending from said stick to opposite sides of said airplane, said connections including a pair of clevis pin joints mounted on opposite sides of said stick for connection to the control stick in a conventional manner, and means on said stick having a link connected to the pin of each clevis pin joint for selectively pulling out the clevis pin from either one of said joints, in case of jamming of the corresponding control surface, to release said control stick for actuation of the remaining control connections.

4. In an aircraft having a single set of control surfaces connected for actuation by a single control stick and a pair of clevis pin connections attached to said control stick and connected to said control surfaces on opposite sides of said aircraft respectively; means on said control stick readily accessible to the pilot and having a link connected to each clevis pin for selectively withdrawing the clevis pin from one of said pair of clevis pin connections, in case of jamming of the corresponding control surface, to release said control stick for free actuation of the remaining control surfaces.

ROBERT AMBROSE FLYNN.

REFERENCES CITED

The following references are of record in the file of this patent:

UNITED STATES PATENTS

| Number | Name | Date |
|---|---|---|
| 1,383,825 | Landon | July 5, 1921 |
| 1,600,079 | Thomas | Sept. 14, 1926 |
| 1,822,386 | Andersen | Sept. 8, 1931 |
| 2,216,489 | Fox | Oct. 1, 1940 |

FOREIGN PATENTS

| Number | Country | Date |
|---|---|---|
| 299,192 | Great Britain | Oct. 25, 1928 |
| 457,771 | France | July 21, 1913 |
| 464,548 | Great Britain | Apr. 20, 1937 |
| 653,287 | France | Nov. 8, 1928 |